United States Patent [19]
Nagata et al.

[11] Patent Number: 4,592,244
[45] Date of Patent: Jun. 3, 1986

[54] DEVICE FOR RECIPROCALLY DRIVING A SHAFT

[75] Inventors: Tomizou Nagata; Kouzou Sakakibara; Makoto Sakano, all of Tokyo, Japan

[73] Assignee: The Japan Tobacco & Salt Public Corporation, Tokyo, Japan

[21] Appl. No.: 706,323

[22] Filed: Feb. 27, 1985

[30] Foreign Application Priority Data

Jun. 13, 1984 [JP] Japan ................... 59-120007

[51] Int. Cl.$^4$ ................... F16H 25/12; F16H 53/08
[52] U.S. Cl. ........................... 74/57; 74/569
[58] Field of Search ................ 74/57-59, 74/569

[56] References Cited

U.S. PATENT DOCUMENTS

| 924,509 | 6/1909 | Taylor, Jr. | |
|---|---|---|---|
| 1,177,428 | 3/1916 | Melin | 74/569 |
| 1,195,665 | 8/1916 | Etter | |
| 2,116,142 | 5/1938 | Chappell et al. | 74/57 |
| 2,216,990 | 10/1940 | Taylor, Jr. | |
| 2,855,783 | 10/1958 | Peters | |
| 3,048,054 | 8/1962 | Heim | 74/57 |
| 3,799,464 | 3/1974 | Bosch | 74/57 |
| 3,854,343 | 12/1974 | May | 74/57 |
| 3,937,102 | 2/1976 | Allen | 74/57 |
| 4,343,200 | 8/1982 | Alworth et al. | |

FOREIGN PATENT DOCUMENTS

| 1485185 | 5/1969 | Fed. Rep. of Germany | 74/569 |
|---|---|---|---|
| 494347 | 9/1919 | France | 74/57 |
| 641050 | 7/1928 | France | 74/57 |
| 57-27954 | 6/1982 | Japan | |
| 533260 | 3/1973 | Switzerland | |
| 426715 | 10/1933 | United Kingdom | |
| 1188763 | 6/1968 | United Kingdom | |
| 1491642 | 3/1976 | United Kingdom | |

OTHER PUBLICATIONS

"Soviet Inventions Illustrated, Sections P,Q: General/Mechanical" Week B47, Jan. 9, 1980, Derwent Publications Ltd., London Q64.

Primary Examiner—Lawrence J. Staab
Attorney, Agent, or Firm—Schwartz, Jeffery, Schwaab, Mack, Blumenthal & Evans

[57] ABSTRACT

A driving device for reciprocating a shaft along an axial direction thereof, comprises a reciprocating shaft drum for slidably supporting the reciprocating shaft along the axial direction thereof, a guide groove drum rotated relative to the reciprocating shaft drum and having an annular guide groove with an intersection on the circumferential surface thereof, and a driven member fixed to the reciprocating shaft and engaged with the guide groove. The driven member includes a cam follower and a boat-shaped member rotatable about a shaft extending from the driven member to the guide groove, the boat-shaped member has a cam roller rotatable about another shaft extending from the driven member to the guide groove, and the guide groove has a cam follower guide path engaged with the cam follower, a cam roller guide path engaged with the cam roller and a boat-shaped member guide path engaged with the boat-shaped member at the intersection thereof. When the guide groove drum is rotated relative to the reciprocating shaft drum, the shaft is reciprocated by engagement of the driven member and the guide groove.

8 Claims, 18 Drawing Figures

FIG. 18 ent invention;
DEVICE FOR RECIPROCALLY DRIVING A SHAFT

BACKGROUND OF THE INVENTION

The present invention relates to a device for driving a reciprocating shaft along its axial direction and, more particularly, to a device which comprises a guide groove drum around which at least one annular guide groove having at least one intersection is formed, a reciprocating shaft which is slidable along the axial direction of the guide groove drum, and a driven member extending from the reciprocating shaft, wherein the driven member is engaged with and guided by the annular guide groove so as to reciprocate the shaft upon the rotation of the guide groove drum.

Devices of this type generally have a cam groove formed in the outer circumferential surface of a drum. The cam groove appears to be a double groove because of a single continuous groove intersection. The driven member fixed to the reciprocating shaft is engaged with the cam groove. When the drum rotates about its central axis or the reciprocating shaft revolute around the circumferential surface of the drum, one reciprocation of the shaft for every two rotations of the drum or every two revolutions of the shaft occurs.

In such a device, when the driven member passes through the intersection of the groove, since walls defining two side surfaces of the guide groove are discontinuous, the driven member cannot be smoothly guided. Therefore, the reciprocating shaft cannot be smoothly driven, resulting in a noisy device. In addition, it is difficult to drive the shaft at high speed.

SUMMARY OF THE INVENTION

The present invention has been made in consideration of the above situation, and has as its object to provide a driving device which can smoothly drive a reciprocating shaft from right to left or left to right upon each rotation of a guide groove drum, and particularly, which can allow a reliably smooth passage through a groove intersection without abutting against the corners of the intersection, and is suited for high speed operation.

According to the present invention, in order to achieve the above object, there is provided a reciprocating shaft driving device comprising a guide groove drum in which an annular guide groove having at least one intersection is formed in a circumferential surface thereof, a reciprocating shaft which is supported by a base and is slidable along an axial direction of the guide groove drum, a driven member projecting from the reciprocating shaft, and a driving means for rotating the guide groove drum or the base around a main shaft, wherein the driven member pivotally supports a cam follower and a boat-shaped member, the boat-shaped member pivotally supports a cam roller at one end thereof, the annular guide groove has a cam follower guide path engaged with the cam follower, a cam roller guide path engaged with the cam roller and a boat-shaped member guide path at the intersection thereof which is engaged with the boat-shaped member, and the driven member is engaged with the annular guide groove and the guide groove drum or the base is rotated so as to reciprocate the reciprocating shaft.

DETAILED DESCRIPTION OF THE PREFERRED EMBODIMENT

A driving device according to one embodiment of the present invention will be described hereinafter with reference to the accompanying drawings.

Figure 1:
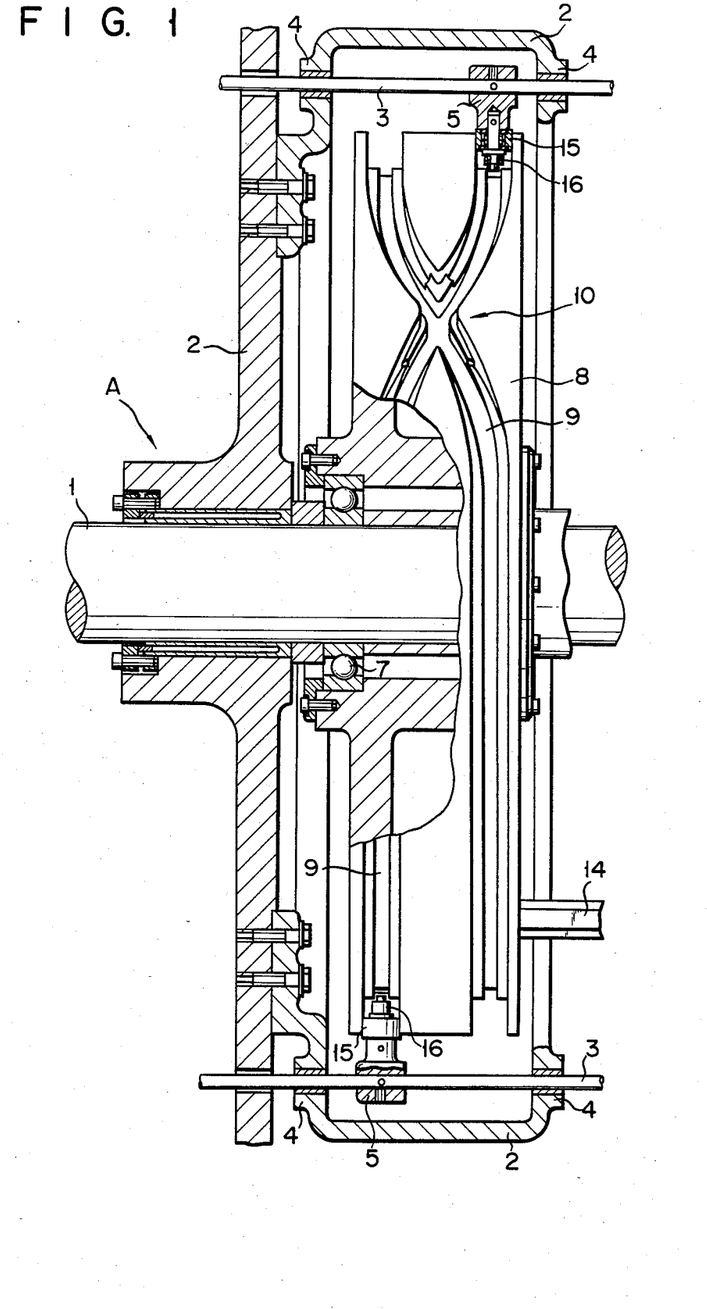
FIG. 1 is a partial sectional side view of a driving device according to one embodiment of the present invention.
Figure 2:
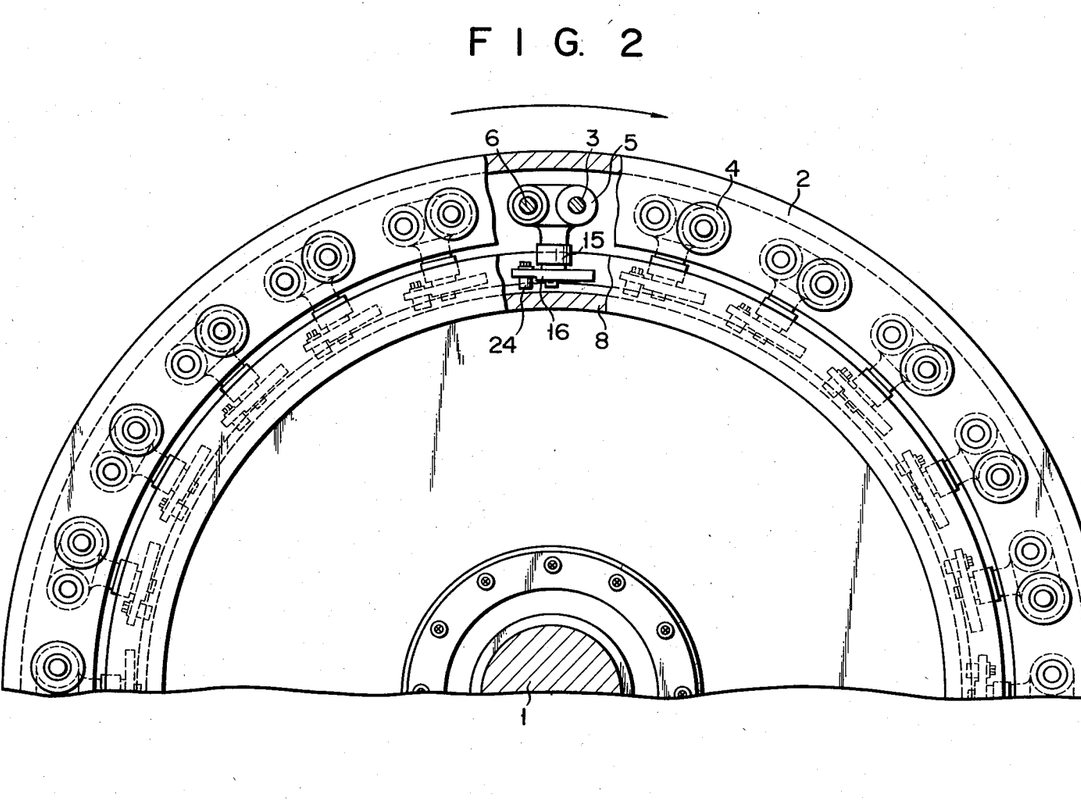
FIG. 2 is a partial cutaway front view of the driving device shown in FIG. 1 in which a half thereof is omitted.

In summary, FIGS. 1 and 2 show a shaft reciprocating device A. A reciprocating shaft drum 2 having a plurality of reciprocating shafts 3 mounted at an outer periphery thereof is coaxial with a guide groove drum 8. Each shaft 3 is engaged with an annular groove 9 through a driven member 5.

The device A comprises a main shaft 1 which is rotated. The drum 2 is coaxially fixed to the main shaft 1. The shafts 3 are provided at the outer periphery of the drum 2 so that two end portions of each shaft 3 extend beyond two end faces of the drum 2.

Each shaft 3 extends parallel to the main shaft 1. Two ends of each shaft 3 are supported by bearings 4 fixed to the drum 2 so that the shaft 3 is slidable along its extending direction. The plurality of shafts 3 are disposed on a single circumferential line having a center which is identical with the center of the main shaft 1 and equally spaced apart from each other. As shown in FIG. 2, in this embodiment, 24 shafts 3 are provided. However, in FIG. 2, a half of the drum 2 is omitted.

The driven member 5 is fixed to each corresponding shaft 3 so as to extend toward the main shaft 1. A slidable shaft 6 is provided parallel to the shaft 3 and is slidably inserted in the driven member 5. The shaft 6 is supported by the drum 2 so that two ends thereof are fixed to the drum 2. In this manner, the shaft 3 having two ends inserted in a pair of bearings 4 is fixed to the driven member 5 and the shaft 6 is inserted therein. For this reason, the driven member 5 is slidable along a direction parallel to the main shaft 1, and is prevented from being rotated around the shaft 3.

The guide groove drum 8 is arranged inside the drum 2 and is rotatably fitted around the main shaft 1 through ball bearings 7. A guide groove 9 is formed on the outer circumferential surface of the drum 8. The driven members 5 fixed to the corresponding shafts 3 are respectively engaged with the groove 9.

The groove 9 is formed on the circumferential surface of the drum 8 as if it were two grooves crossing at an intersection 10. However, in fact, the groove 9 is constituted by a single continuous annular groove. The groove 9 has a cam follower guide path 11, a cam roller guide path 12 and, at the intersection 10, a boat-shaped member guide path 13 to be described later.

When the drums 2 and 8 are rotated relative to each other around the main shaft 1, each shaft 3 is reciprocated along a direction parallel to the shaft 1 through the driven member 5 which is engaged with and guided by the groove 9. In this embodiment shown in FIGS. 1 and 2, the drum 2 is rotated and the drum 8 is stopped. Because a stop member 14 abuts against the drum 8 to prohibit its rotation. When the main shaft 1 and drum 8 are rotated, the drum 2 remains stationary.

Figure 3:
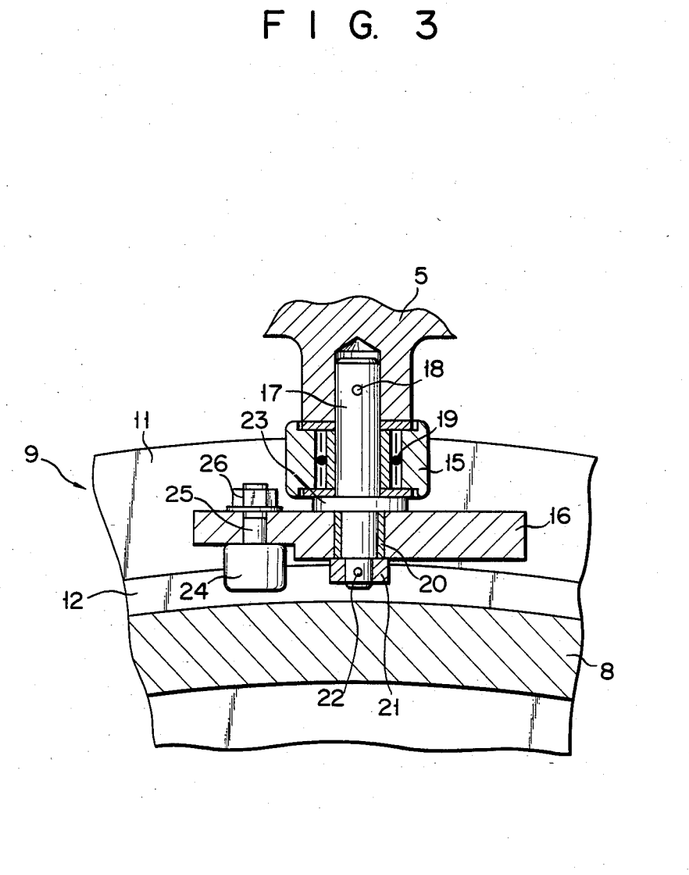
FIG. 3 is a partial cutaway sectional view of the driven member taken along an extending direction of a guide groove.

As shown in FIG. 3, the driven member 5 has, at its end portion thereof engaging with the groove 9, a cam follower 15 and a boat-shaped member 16 which are rotatable about an axis perpendicular to the shaft 3. In other words, a shaft 17 is inserted in the end portion of the member 5 to extend along a direction perpendicular to the shaft 3 and is fixed thereto by a lock pin 18. The cam follower 15 is rotatably fitted around an intermediate portion of the shaft 17 through a needle bearing 19. The boat-shaped member 16 is fitted around a distal end portion of the shaft 17 through a bush 20 so as to be rotatable about it. A collar 21 is fixed to a distal end of the shaft 17 by a lock pin 22.

In this manner, the cam follower 15 and the boat-shaped member 16 cannot be removed from the shaft 17 because of the collar 21. In order to separately rotate the cam follower 15 and the member 16, a ring 23 is provided therebetween so as to separate them by a small gap.

The boat-shaped member 16 is formed into a boat shape, has proper length, width and height, and distal and trailing ends thereof are properly shaped so as to fit into the boat-shaped member guide path 13. A cam roller 24 is mounted at the rear end portion of the boat-shaped member 16 along its moving direction and is rotatably supported by a shaft 25 parallel to the shaft 17. The shaft 25 is fixed to the member 16 by a nut 26.

As shown in FIGS. 4 to 11, the guide groove 9 formed in the circumferential surface of the drum 8 includes the cam follower guide path 11, the boat-shaped member guide path 13, and the cam roller guide path 12.

Figure 4:
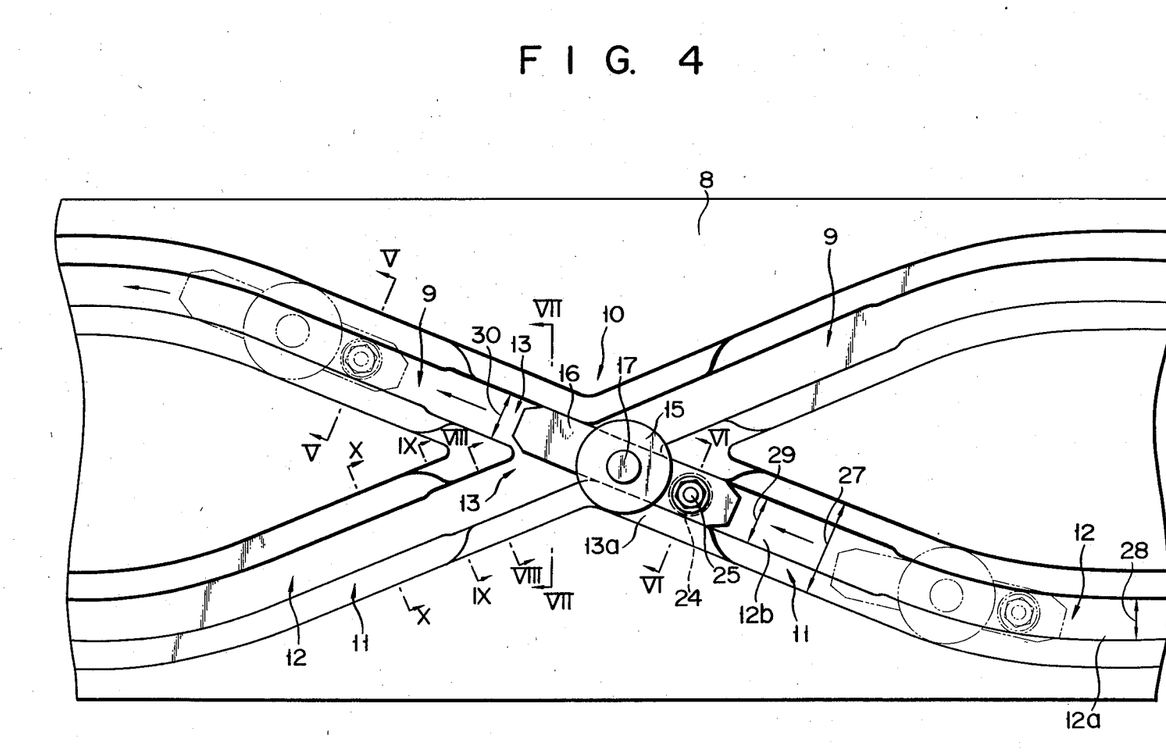
FIG. 4 is a developed view for explaining movement of a driven member at an intersection of a guide groove shown in FIG. 1.
Figure 5:
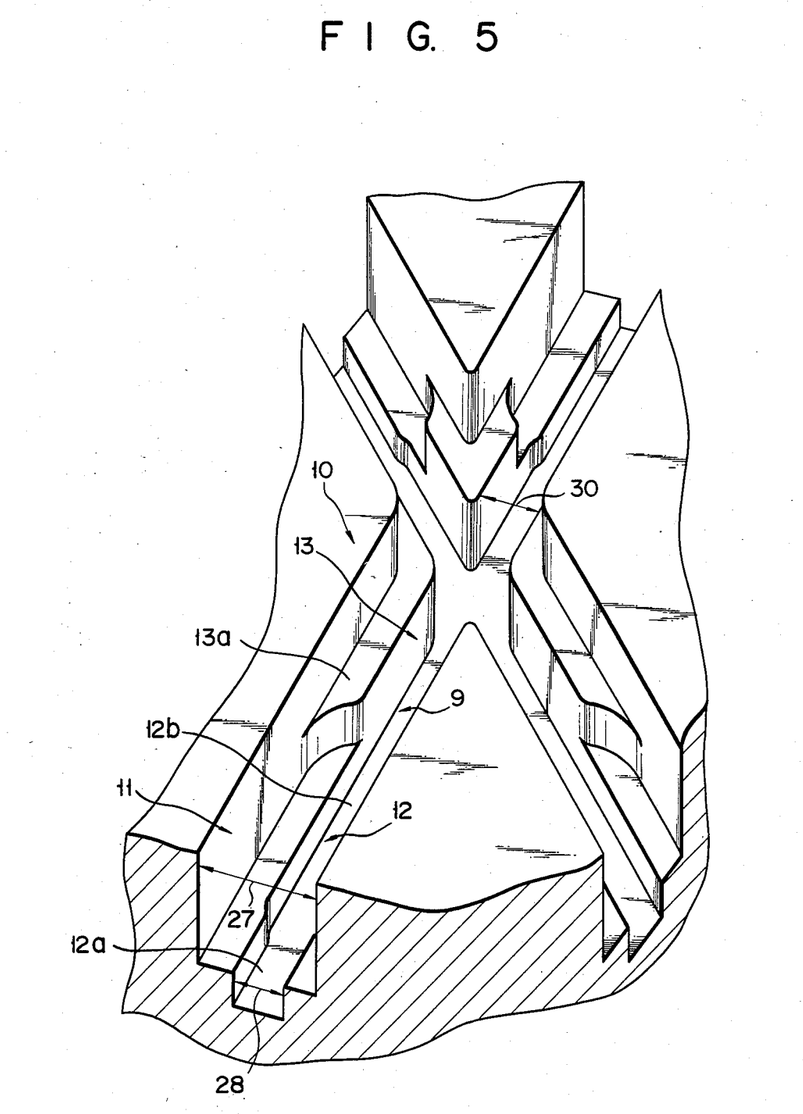
FIG. 5 is a partial cutaway perspective view schematically showing the intersection of the guide groove.
Figure 6:
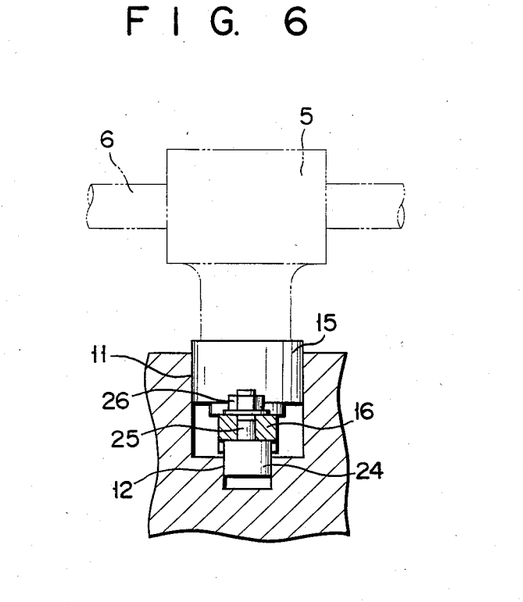
FIGS. 6 to 11 are sectional views of the guide groove taken along lines VI—VI, VII—VII, VIII—VIII, IX—IX, X—X and XI—XI of FIG. 4, respectively.
Figure 7:
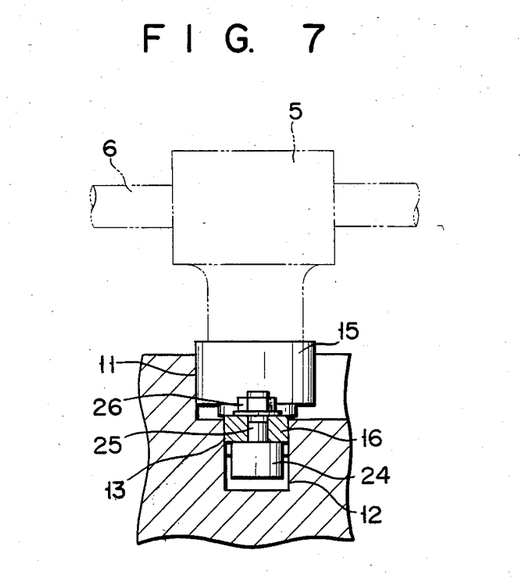
Figure 8:
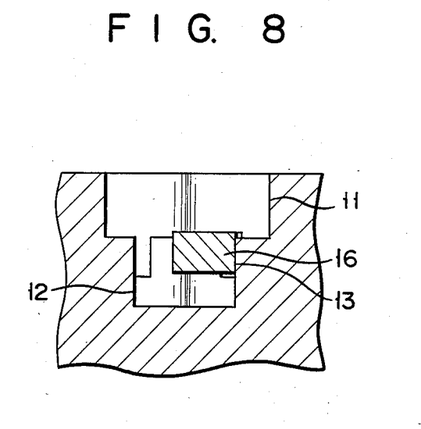
Figure 9:
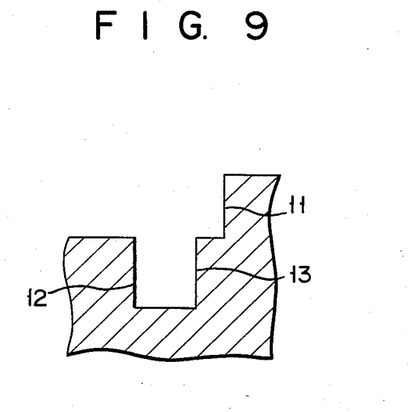
Figure 10:
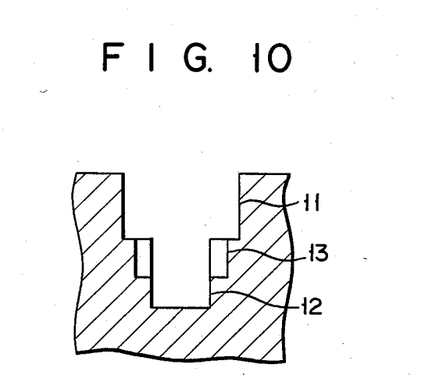
Figure 11:
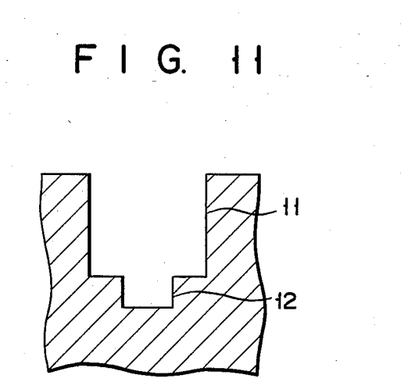

The cam roller guide path 12 is formed on the bottom portion of the cam follower guide path 11, and comprises a first portion 12a having a width 28 sufficient for engaging with and guiding the cam roller 24 at a portion distant from the intersection 10, and a second portion 12b having a width 29 wider than the width 28 of the portion 12a at the intersection 10 so as not to engage with the cam roller 24. The wider second portion 12b of the guide path 12 is shown in FIGS. 4 and 5.

Projections 13a which define the boat-shaped member guide path 13 are formed on side walls of the cam follower guide path 11 of the intersection 10. Each projection 13a extends from the bottom surface of the guide path 11 to an intermediate level of the side wall thereof. The boat-shaped member guide path 13 has a width 30 which is sufficient for slidably guiding the boat-shaped member 16. Note that the projection 13a is formed to gradually extend inside the path 11 from its side surface.

The boat-shaped member 16 has a width which is suited for the boat-shaped member guide path 13 so that two linearly extending side surfaces are slidable along the corresponding side surfaces of the path 13, and each of forward and backward ends is formed into a tapered shaped. As is apparent from FIGS. 6 and 7, the width of the member 16 is slightly larger than a diameter of the cam roller 24.

The width 29 of the second portion 12b of the cam roller guide path 12 is the same as that of the boat-shaped member guide path 13. Therefore, at the intersection 10, the side surfaces of the second portion 12b of the guide path 12 and those of the guide path 13 form a continuous planar surface.

The length of the second portion 12b of the guide path 12 is longer than that of the guide path 13 provided at the intersection 10, i.e., front and rear ends of the portion 12b extend from those of the guide path 13. Note that front and rear extending portions of the portion 12b are formed longer at an entrance side of the intersection 10 and formed shorter at an exit side thereof.

The length of the guide path 13 is properly determined with reference to a length of the member 16 and a distance between the cam follower 17 and the shaft 25. The length of the guide path 13 is determined such that when the distal end of the boat-shaped member 16 reaches the guide path 13, the cam roller 24 can move from the first portion 12a to the second portion 12b of the guide path 12.

The sectional shape of the guide groove 9 is shown in FIGS. 6 to 11 taken along lines VI—VI, VII—VII, VIII—VIII, IX—IX, X—X, and XI—XI of FIG. 4, respectively.

Operation of the driven member 5 at the intersection 10 will be described with reference to FIGS. 12 to 18.

Figure 12:
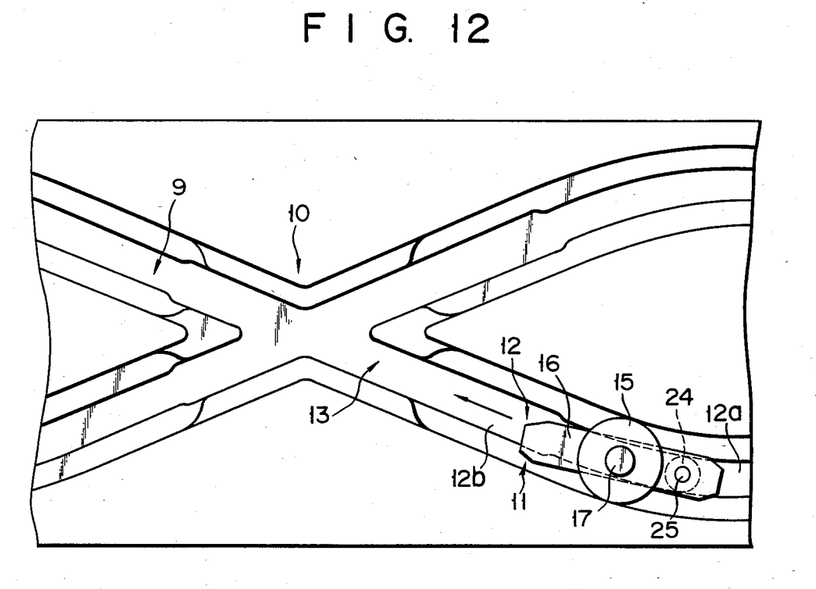
FIGS. 12 to 18 are plan views for respectively explaining an operation of the driven member at the intersection of the guide groove.

In FIG. 12 wherein the driven member 5 has not reached the intersection 10, the cam follower 15 is engaged with the two side surfaces of the cam follower guide path 11, and the cam roller 24 is engaged with the two side surfaces of the first portion 12a of the guide path 12. Note that the boat-shaped member 16 only serves as a common base of the cam roller 24.

Figure 13:
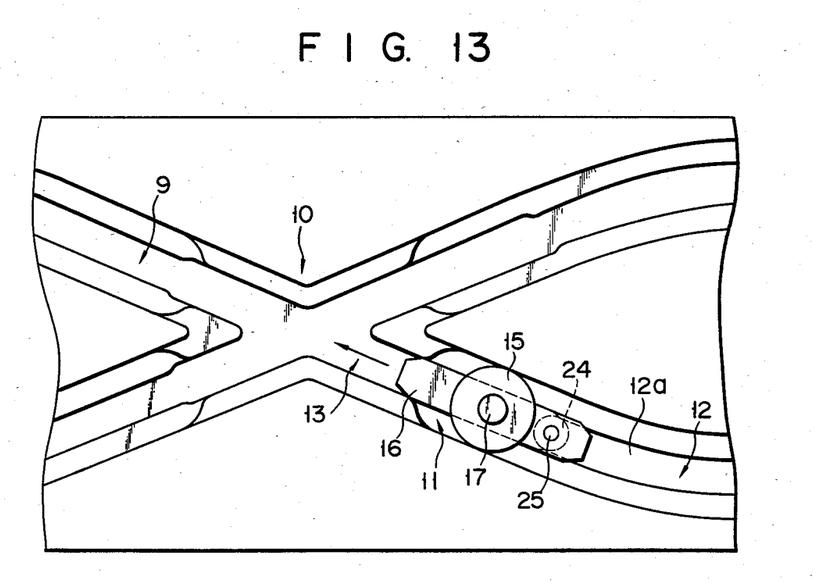

In FIG. 13 wherein the driven member 5 is about to enter the intersection 10, the cam roller 24 enters the second portion 12b of the guide path 12. When the cam roller 24 is released, the distal end of the boat-shaped member 16 is engaged with the two side surfaces of the guide path 13. The driven member 5 moves in accordance with a path regulated by the member 16 and the cam follower 15.

Figure 14:
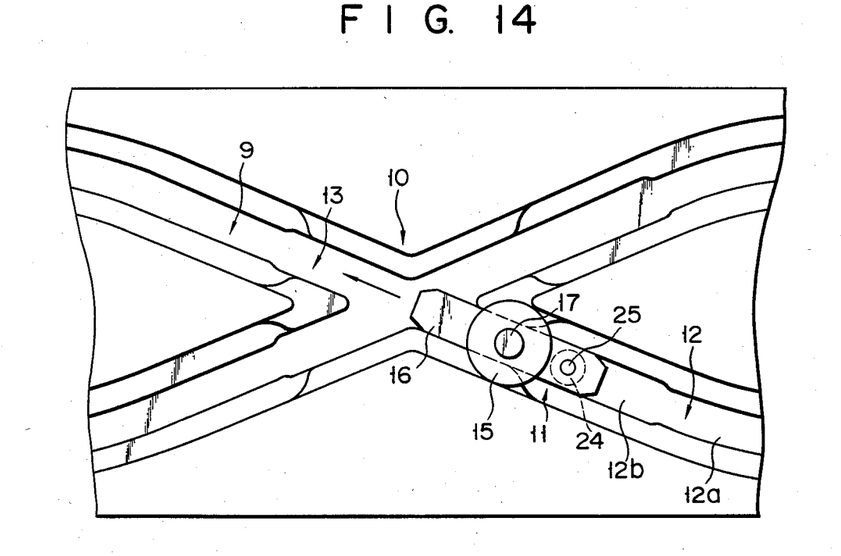

In FIG. 14 wherein the driven member 5 has entered the intersection 10, the driven member 5 is approaching a central portion of the intersection 10, and one side surface of the guide path 11 is discontinued. In this state, a path of the driven member 5 is regulated by the member 16 sliding along the guide path 13. Therefore, the driven member 5 can smoothly cross the intersection 10.

Figure 15:
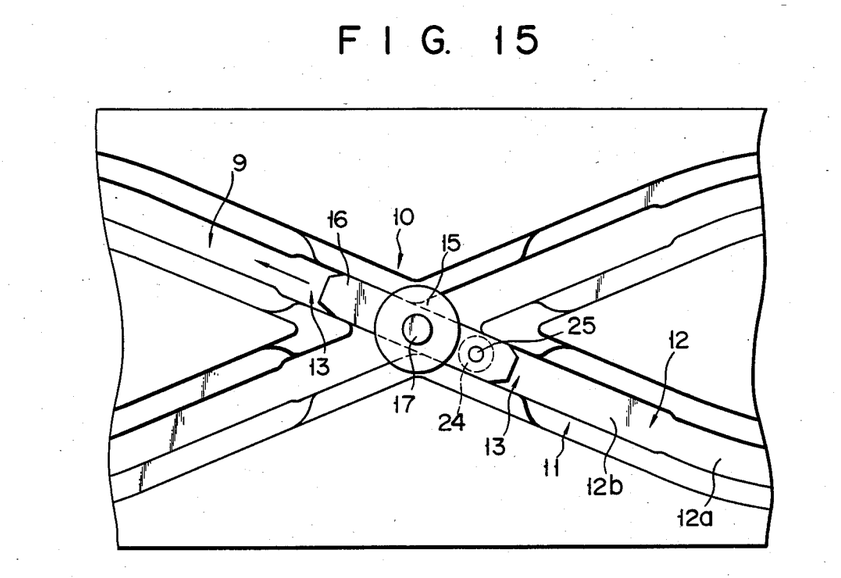

In FIG. 15 wherein the driven member 5 has reached the central portion of the intersection 10, the cam follower 15 and the cam roller 24 are not guided by the two side surfaces of the guide paths 11 and 12. However, since the boat-shaped member 16 crosses the intersection of the guide groove 9, the front and rear end portions of the member 16 are respectively engaged with the two side surfaces of the guide path 13 across the intersection 10. Thus, the driven member 5 is guided in a bridging manner, resulting in a smooth motion.

Figure 16:
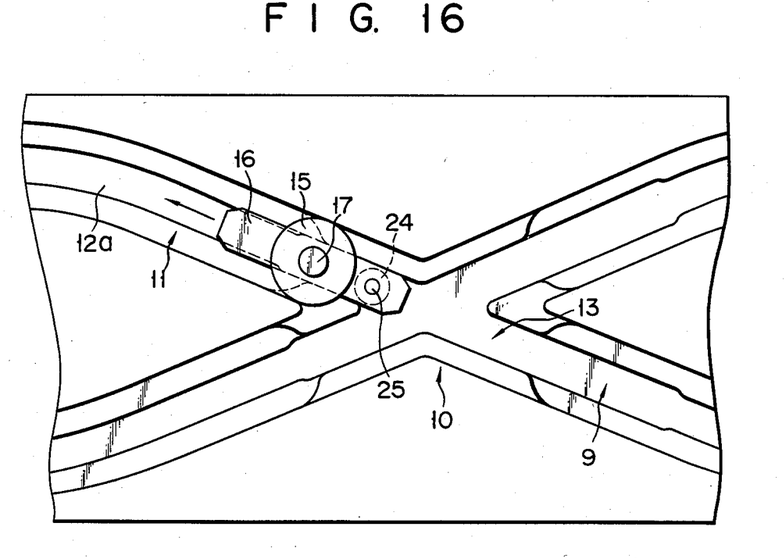

In FIG. 16 wherein the driven member has passed through the central portion of the intersection 10, the driven member 5 is guided by the regulating member 16, and the cam follower 15 is regulated by the two side surface of the guide path 11 at the opposite side thereof.

Figure 17:
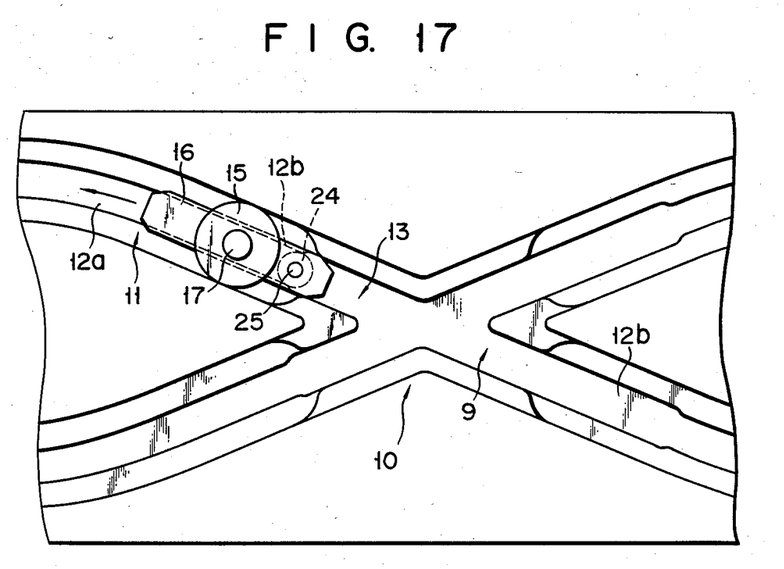

In FIG. 17 wherein the driven member 5 is passing through the intersection 10, the cam follower 15 is engaged with the two side surfaces of the guide path 11 at the opposite side. When the rear end of the member 16 is released from the two side surfaces of the guide path 13 at the opposite side, the cam roller 24 passes through the second portion 12b of the guide path 12 at the opposite side and reaches the first portion 12a so as to be guided by the two side surfaces thereof. In this manner, the path of the driven member 5 is regulated by the cam follower 14 and the cam roller 24.

Figure 18:
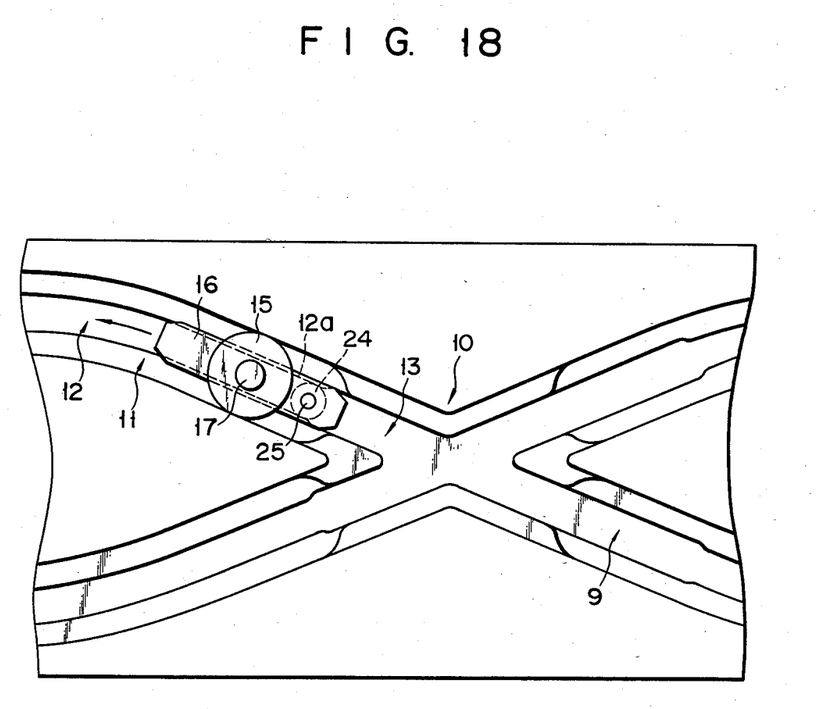

In FIG. 18 wherein the driven member 5 has passed through the intersection 10, the cam follower 15 of the driven member 5 is engaged with the two side surfaces of the guide path 11, and the cam roller 24 thereof is engaged with the two side surfaces of the first portion 12a of the guide path 12. In this manner, the driven member 5 is guided by the guide groove 9 and is slid along the main shaft 1.

As described above, the shaft reciprocating device A according to this embodiment guides the driven member along the annular guide groove formed on the guide groove drum. For example, the reciprocating shaft is reciprocated once for every two rotations of the reciprocating shaft drum. In addition, since the driven member comprises the cam follower, the boat-shaped member and the cam roller, smooth operation thereof can be achieved.

Particularly, the main feature of the present invention is to smoothly guide the reciprocating shaft by using the bridging effect of the driven member at the intersection of a guide groove. In this manner, the movement of the driven member at the intersection can be reliably preformed without abutting against the corners of the intersection.

The present invention is not limited to the above embodiment and various changes and modifications may be made within the spirit and scope of the invention. For example, the number of intersections or annular guide grooves can be increased as needed.

The shaft reciprocating device for reciprocating once for every two rotations of the guide groove drum as described above can be applied to, e.g., a cigarette double packaging machine. In this packaging machine, a plurality of packaging core bar member assemblies are arranged so as to constitute two annular arrays. The arrays of the assemblies are alternated for each rotation. A device for alternating the arrays is coupled to the reciprocating shafts and is driven.

What is claimed is:

1. A driving device for reciprocating a shaft along an axial direction thereof, comprising:
   a supporting base for slidably supporting the reciprocating shaft along the axial direction thereof;
   a guide groove drum rotated relative to said supporting base and having at least one annular guide groove with at least one intersection on a circumferential surface thereof; and
   a driven member fixed to said reciprocating shaft and engaged with said guide groove,
   said driven member having a cam follower and a boat-shaped member rotatable about an axis extending from said driven member to said guide groove,
   said boat-shaped member having a cam roller rotatable about another axis extending from said driven member to said guide groove, and
   said guide groove having a cam follower guide path engaged with said cam follower, a cam roller guide path engaged with said cam roller and a boat-shaped member guide path engaged with said boat-shaped member at the intersection thereof,
   whereby when said guide groove drum and said supporting base are rotated relative to each other, said reciprocating shaft is reciprocated by engagement of said driven member and said guide groove.

2. The driving device according to claim 1, wherein said supporting base is constituted by a reciprocating shaft drum, said reciprocating shaft being provided at an outer periphery of said reciprocating shaft drum so as to be slidable along a central axis thereof.

3. The driving device according to claim 2, wherein said guide groove drum is coaxially provided in said reciprocating shaft drum to be rotatable, said guide groove being formed on an outer circumferential surface of said guide groove drum.

4. The driving device according to claim 1, wherein said cam roller guide path is formed on a bottom surface of said cam follower guide path, the axis of said cam follower is arranged parallel to another axis of said cam roller, and said cam roller is mounted at a position further away from said driven member than that of said cam follower.

5. The driving device according to claim 4, wherein said cam roller is arranged after said cam follower with respect to a moving direction of said driven member.

6. The driving device according to claim 5, wherein said cam roller guide path has a first portion distant from the intersection, and a second portion in the vicinity of the intersection, said first portion having a width sufficient for being engaged with said cam roller, and said second portion having a width sufficient for freely fitting said cam roller therein.

7. The driving device according to claim 6, wherein said cam follower guide path has a width sufficient for being engaged with said cam follower.

8. The driving device according to claim 7, wherein said boat-shaped member guide path has a width sufficient for being engaged with said boat-shaped member.

* * * * *